United States Patent [19]

Steven et al.

[11] 3,720,545
[45] March 13, 1973

[54] STEEL MOLD AND METHOD FOR PRODUCING THE SAME

[75] Inventors: Gary Steven; Kenneth E. Pinnow, both of Pittsburgh, Pa.

[73] Assignee: Crucible Inc., Pittsburgh, Pa.

[22] Filed: Aug. 20, 1971

[21] Appl. No.: 173,520

[52] U.S. Cl. ............................ 148/2, 148/3, 249/135
[51] Int. Cl. .............................. B28b 7/34, B29c 1/02
[58] Field of Search ........ 148/2, 3, 12, 12.4, 135, 37; 249/135; 264/337; 18/47 R

[56] References Cited

UNITED STATES PATENTS

| | | | |
|---|---|---|---|
| 2,306,421 | 12/1942 | Arness | 75/128 W |
| 2,695,229 | 11/1954 | Sheridan | 75/128 W |
| 3,023,098 | 2/1962 | Wylie | 75/128 W |
| 3,152,934 | 10/1964 | Lula et al. | 75/128 W |

*Primary Examiner*—Charles N. Lovell
*Attorney*—Clair X. Mullen, Jr.

[57] ABSTRACT

A weldable, corrosion resistant steel mold, particularly suited for use in plastic-injection molding, characterized by ease of heat treatment to BHN 300/400 range and having excellent dimensional stability during heat treatment, deep hardenability, good notch toughness, said steel mold having essentially a composition comprising, in weight percent, carbon up to 0.06, manganese up to 2, silicon up to 1, nickel 2 to 4.0, chromium 10.0 to 14.0, molybdenum up to 1.0, copper up to 1.00, nitrogen up to 0.05, sulfur up to 0.10 and balance iron.

9 Claims, 3 Drawing Figures

STEEL MOLD AND METHOD FOR PRODUCING THE SAME

Molds for use in the injection molding of plastics, and particularly vinyl-base plastics, are subjected to a corrosive effect during use. Specifically, when vinyl-base plastics are injection-molded a partial chemical breakdown of the plastic causes the release of hydrochloric acid, which attacks the alloy of the mold. Consequently, molds for plastic injection molding are customarily made of a hardenable, corrosion resistant stainless steel.

Several other properties, in addition to corrosion resistance, determine the suitability and selection of materials for plastic injection molds. High mechanical strength and good toughness are needed to obtain satisfactory mold performance and long service life. Ease of heat treatment, dimensional stability during heat treatment, deep hardenability, easy machinability, and good polishability are also needed. These desirable attributes of the mold steel facilitate fabrication of the molds and minimize their manufacturing costs. Finally, good weldability of the mold steel is desired to facilitate mold changes and repairs.

The material used in plastic injection molds must be within the hardness range of about 300 to 400 and preferably 300 to 350 BHN. This cited hardness range is critical. Above about 400 BHN the machinability is reduced to commercially unacceptable levels; below about 300 BHN the molds have insufficient mechanical strength and durability. A large number of plastic injection molds in use today are machined from steel blocks already prehardened to the desired hardness range of 300 to 350 BHN. Less commonly, molds are rough machined from annealed mold blocks, which are then heat treated to the 300 to 350 BHN range and the mold cavity finished by machining and polishing.

AISI Type 420 stainless steel is the most commonly used corrosion resistant material for plastic-injection molds. To obtain a hardness between 300 and 350 BHN with AISI Type 420 stainless steel, it is necessary to temper the steel after hardening within a critical temperature range. With Type 420 the preferred hardness range is coincident with the very steep part of the tempering curve, as will be more fully demonstrated hereinafter, and it is difficult to control the heat treating operation to obtain the desired hardness range, particularly with larger mold blocks. It has now been discovered in accordance with this invention that with a martensitic stainless steel in which various constituents are controlled within certain compositional ranges, it is possible to produce the corrosion resistance and hardness required in plastic injection mold materials with a simple heat treatment and at the same time obtain better dimensional stability, hardenability and toughness than currently obtainable by the conventional use of AISI Type 420 stainless steel.

It is, therefore, a primary object of the present invention to provide a martensitic stainless steel mold and a method for producing the same that achieves the desired corrosion resistance in combination with being heat treatable to a hardness within the range of 300 to 400 BHN and preferably 300 to 350 BHN, without requiring said heat treating to be conducted within a very narrow, critical temperature range. It is a further more specific object of the invention to produce a weldable, highly corrosion resistant martensitic stainless steel mold, for use as plastic injection molds, having superior notch toughness.

These and other objects of the invention as well as a complete understanding thereof may be obtained from the following description, specific examples and drawings, in which:

FIG. 1 is a graph showing the relationship between tempering temperature and hardness for a Type 420 stainless steel with the following composition in weight percent, carbon 0.33, manganese 0.47, silicon 0.35, nickel 0.22, chromium 13.88, molybdenum 0.06, and balance iron;

Figure 1:
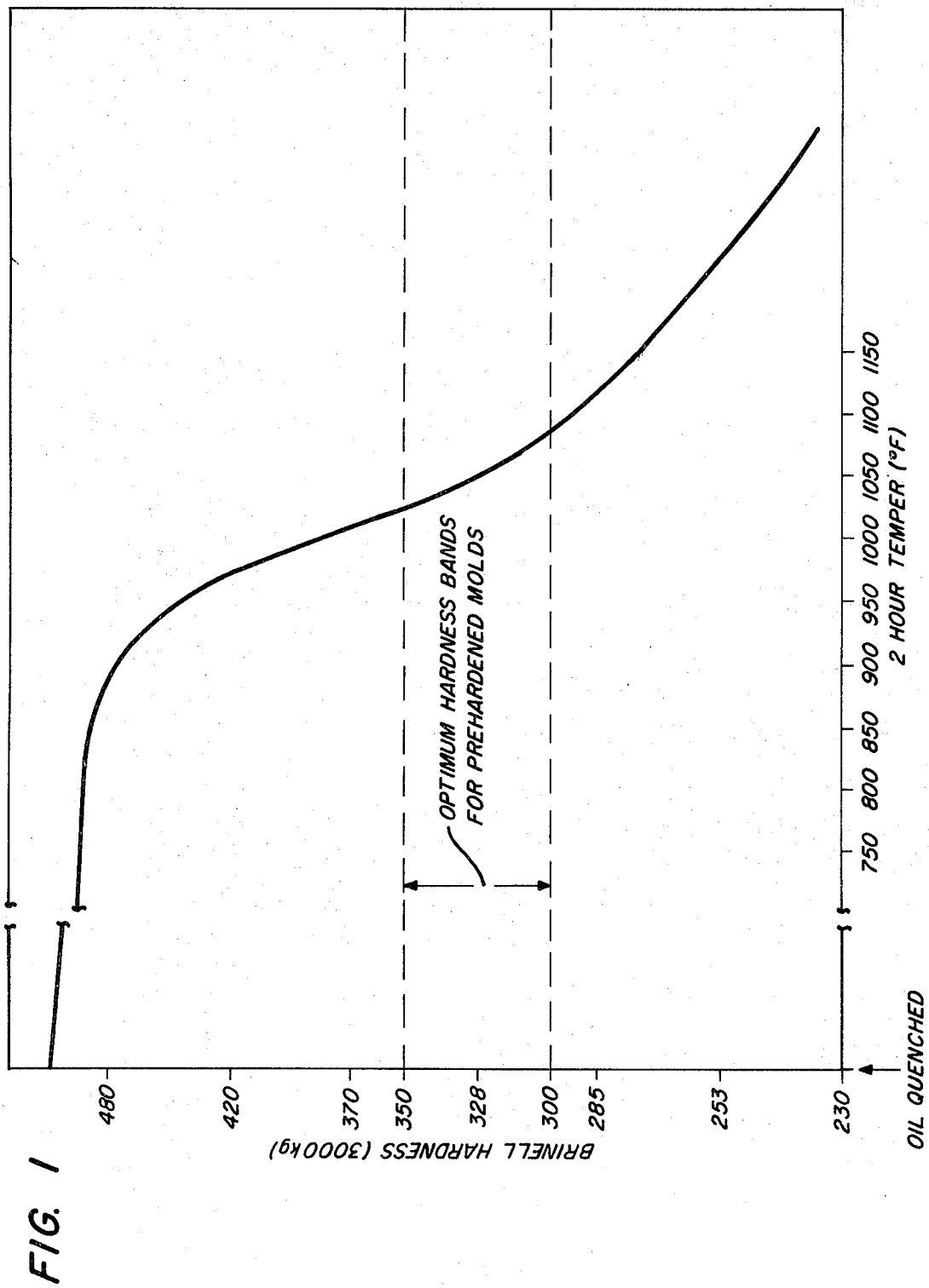

As mentioned hereinabove in the production of stainless steel molds for use in plastic injection molding it is customary to cast a stainless steel in ingot form and then hot work it to the desired mold-block shape, which many times may be a typical rectangular billet. In any event, the mold block is then heat treated to the desired final hardness which is normally within the range of 300 to 350 BHN. With conventional AISI Type 420 stainless steel, as shown in FIG. 1, the tempering temperature curve within the desired hardness range of 300 to 400 BHN, and preferably 300 to 350 BHN, is particularly steep, which necessitates that exceptionally close control be used during the tempering operation to obtain a hardness within the required range. As is well known, this is particularly difficult to achieve with large mold blocks since long times may be required to heat the steel block throughout its cross section to a temperature necessary to achieve the required hardness. With a large mold block, it is thus very difficult to reduce the hardness in the center to the desired range of 300 to 350 BHN and yet maintain the minimum hardness at the surface.

Figure 2:
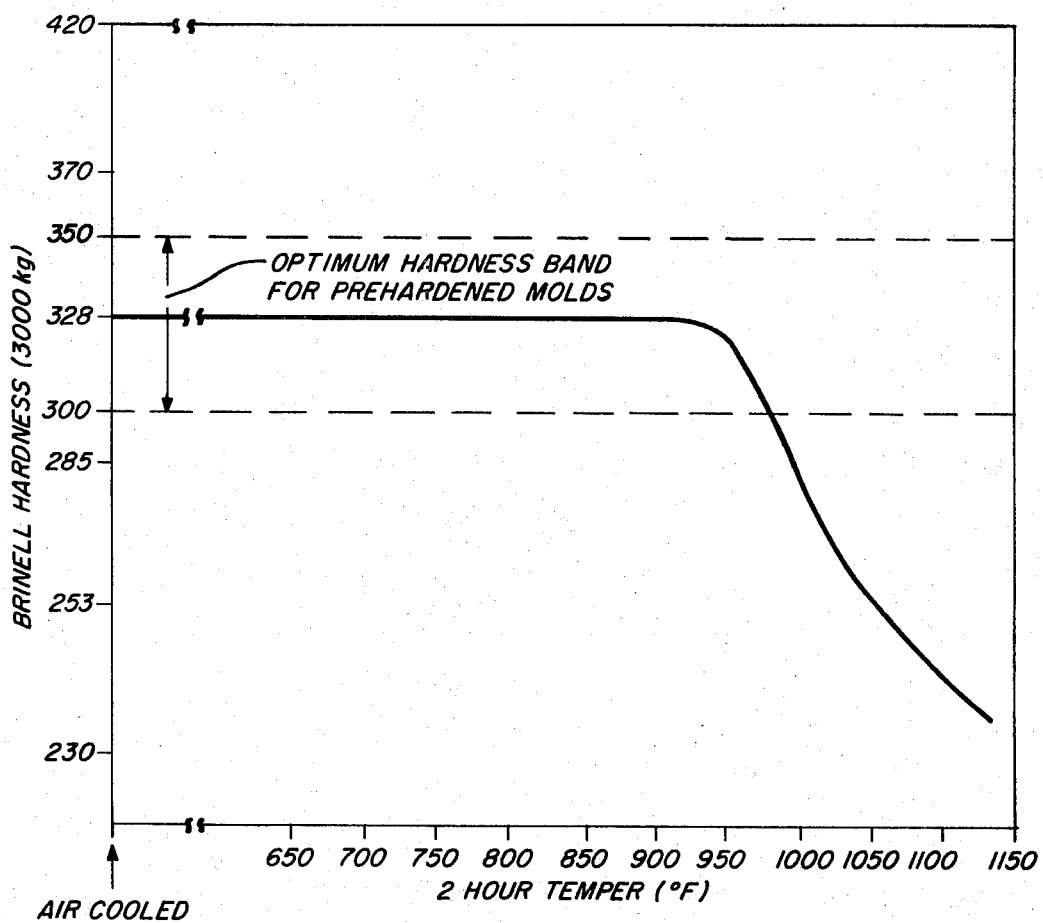
FIG. 2 is a graph similar to FIG. 1 but showing the relationship between air-cooled hardness and hardness obtained after tempering for a steel mold in accordance with this invention, e.g., Heat 139470 (Table II)

In contrast by producing mold blocks in accordance with the present invention with a stainless steel within the composition limits set forth in Table I, the required corrosion resistance is achieved in combination with the ability of the mold block to be heat treated over a relatively wide temperature range and yet achieve the desired hardness within the range of 300 to 400 and preferably 300 to 350 BHN. It is shown in FIG. 2 that steels in accordance with the invention provide the required hardness both in the as-hardened condition and also when stress-relief annealed after hardening over a relatively wide range of temperatures. Also, in contrast to AISI Type 420 stainless steels which are normally austenitized from 1,700° to 1,900°F, steel mold materials in accordance with the invention can be austenitized from 1,300° to 1,600°F. The lower austenitizing temperature requirements promote less oxidation and decarburization during heat treatment, thereby reducing the amount of metal lost either by oxidation or by machining after heat treatment, and in addition lower heat treating temperatures are easier to obtain and less expensive to maintain in large industrial heat-treating furnaces.

TABLE I

| Element | Broad Composition Range Weight % | Preferred Composition Range Weight % |
| --- | --- | --- |
| Carbon | 0.06 max. | 0.03 max. |
| Manganese | 2 max. | 0.50 max. |
| Silicon | 1 max. | 0.50 max. |
| Nickel | 2 to 4.0 | 2.50 to 3.50 |
| Chromium | 10.0 to 14.0 | 11.0 to 13.0 |
| Molybdenum | 1.0 max. | 0.50 max. |
| Nitrogen | 0.05 max. | 0.03 max. |
| Sulfur | Up to 0.10 | 0.03 max. |
| Copper | 1.00 max. | 0.50 max. |
| Iron | Balance | Balance |

It is necessary within the broad composition range in Table I to control the overall composition of the material of the stainless steel molds such that the molds will be substantially martensitic in the as-hardened condition. Large amounts of delta ferrite are detrimental and would, for example, significantly reduce hardness, toughness and polishability of the mold. To obtain a substantially fully martensitic structure in the as-hardened condition, it is essential that the composition be balanced with respect to the austenite- and ferrite-promoting elements while maintaining chromium at a level necessary to achieve the required corrosion resistance. Furthermore, to obtain the desired hardness of 300 to 400 BHN, it is necessary to control composition, particularly carbon and nitrogen, such that the hardness in the as-hardened condition does not exceed 400 BHN.

In accordance with the invention, if carbon and/or nitrogen are above the recited maximums, they will increase the hardness of the mold above the level tolerable for acceptable machinability. In addition, such would increase the likelihood of cracking after hardening or welding and thereby create the need for tempering and also increase the complexity of mold production and mold repair.

Manganese increases martensitic hardness slightly, but does not improve corrosion resistance or substantially affect austenite-ferrite balance. Manganese contents above the recited upper limit increase cost without improving properties.

Silicon is useful for increasing chromium recovery during melting. Silicon also slightly improves corrosion resistance, but increases the amount of nickel needed to attain a substantially fully martensitic structure after hardening. Consequently, silicon contents above the recited range increase cost.

Nickel is necessary within the recited range for austenite-ferrite balance and for corrosion resistance, but should not exceed the recited maximum from the cost standpoint.

Chromium is necessary for corrosion resistance, but increases the requirement for nickel and other austenite-promoting elements needed to obtain a substantially fully martensitic structure after hardening. Chromium must therefore be controlled as set forth above to provide the required corrosion resistance and to minimize cost.

Molybdenum is present for strength and corrosion resistance, but an amount above the recited limit would add significantly to cost without justifiably improving properties.

Sulfur very substantially improves machinability, but decreases notch toughness and polishability. Sulfur must, therefore, be limited to the cited maximum to maintain good polishability and adequate toughness. When a blemish-free, mirror finish is required on a decorative plastic component, the sulfur content of the mold steel must be limited to 0.03 percent; on the other hand, to produce functional plastic parts, an 0.10 percent max. sulfur is acceptable.

Copper is useful for controlling austenite-ferrite balance, but is less effective than nickel in promoting austenite. Also, copper in amounts greater than specified above produces significant age-hardening during stress-relief anneals. Copper above the recited upper limit is, therefore, undesirable.

To produce a stainless steel mold of this invention, a composition within the limits set forth in Table I is cast, preferably in conventional ingot form, and then hot worked to form a mold block, which may be a typical rectangular billet. The mold block is heat treated to a hardness within the range of 300 to 400 BHN and preferably 300 to 350 BHN after which it is machined and polished to form the desired mold cavity therein. Machining is accomplished after hardening treatment to avoid any distortion caused by the hardening treatment, which would then require further machining for correction and thereby add to the cost of the operation. Because the mold blocks are machined in the hardened condition, it is critical that hardness be closely controlled at the desired level. Specifically, in this regard, if the mold block is at a hardness higher than that required for its intended function the machining operation will be rendered correspondingly more difficult, thus adding to the machining costs for mold production. It has been found in the practice of the invention that a hardness within the desired range may be achieved by heating within the temperature range of 1,300° to 1,600°F and air cooling. More specifically, a temperature of about 1,550°F is preferred for the purpose. After the hardening treatment and the machining operation, the mold block may be stress-relief annealed, preferably at a temperature within the range of 500° to 800°F.

To demonstrate the invention, and for purposes of comparison with conventional material, specimens of mold material in accordance with the invention and conventional mold material, as listed in Table II, were prepared for testing as hereinafter set forth. Pertinent data taken from the literature are also included for comparison.

TABLE II

[Chemical composition of mold steels made in accordance with the invention and other commercial mold steels used in comparative properties evaluation]

| Steel grade | Heat number | Chemical composition, weight percent | | | | | | | | | |
| --- | --- | --- | --- | --- | --- | --- | --- | --- | --- | --- | --- |
| | | C | Mn | P | S | Si | Ni | Cr | Mo | Cu | N | Other |
| | 131187 | 0.035 | 0.33 | 0.010 | 0.012 | 0.10 | 2.78 | 12.88 | 0.26 | 0.06 | 0.032 | ¹ 0.01 |
| | 110804 | 0.035 | 0.30 | 0.008 | 0.012 | 0.12 | 2.98 | 11.80 | 0.24 | | | ¹ 0.01 |
| | 139470 | 0.025 | 0.28 | 0.012 | 0.015 | 0.10 | 2.84 | 12.42 | 0.26 | 0.11 | 0.026 | |
| | 130330 | 0.040 | 0.29 | 0.013 | 0.018 | 0.10 | 2.67 | 11.92 | 0.24 | 0.04 | 0.026 | ¹ 0.003 |

Table II – Continued

[Chemical composition of mold steels made in accordance with the invention and other commercial mold steels used in comparative properties evaluation]

| Steel grade | Heat number | Chemical composition, weight percent | | | | | | | | | | |
|---|---|---|---|---|---|---|---|---|---|---|---|---|
| | | C | Mn | P | S | Si | Ni | Cr | Mo | Cu | N | Other |
| | 131348 | 0.030 | 0.20 | 0.021 | 0.010 | 0.14 | 2.92 | 12.77 | 0.21 | | 0.033 | |
| | X65483 | 0.018 | 0.30 | 0.015 | 0.09 | 0.22 | 2.75 | 12.50 | 0.02 | | | 1.04 |
| Type 410 | | 0.140 | 0.50 | 0.016 | 0.013 | | 0.25 | 12.38 | 0.11 | | | |
| Type 420* | | 0.290 | 0.25 | 0.030 | 0.037 | 0.29 | 0.39 | 12.68 | Trace | 0.12 | | |
| Type 420** | | 0.250 | 0.29 | | | 0.37 | 0.13 | 13.40 | | | | |
| P-20 | | 0.330 | 0.85 | | | 0.65 | | 1.74 | 0.45 | | | |

¹ Al.
*E. A. Oldfield and G. B. Graves, "Effect of Hardening and Tempering on the Corrosion Resistance of 13% Cr", Metal Treatment and Drop Forging, June 1956, 211–215.
**W. Peter and W. Matz, "Das Umwandlungsverhalten von Stahlen mit 12 bis 14% Cr", Archiv fer das Eisenhuettenwesen, 28, No. 12, December 1957, 815–819.

Table III summarizes drill test machinability data obtained on different heats of mold steel made in accordance with the invention and having hardnesses from as-annealed (250 BHN) to fully hardened (368 BHN) and sulfur contents from 0.012 to 0.090 percent. The machinability indexes given in Table III were obtained by comparing the times required to drill holes of the same size and depth in the subject mold steels and in conventional P–20 mold material with a hardness of 321 BHN. The machinability of the P–20 steel at 321 BHN is representative of that required in prehardened plastic injection molds.

TABLE III

CUMULATIVE DRILL MACHINABILITY TEST RESULTS

| Material | Heat Treatment | Hardness BHN | Machinability index %* |
|---|---|---|---|
| P-20 | 1550F/1 hr, oil quench 1125F/2+2 hr | 321 | 100 base line |
| Heat No. 131187 (.035% C - .012% S) | 1550F/5 hr, air-cooled 750F/2+2 hr + 900F/2 hr + 950F/2 hr | 293/302 | 110 |
| Heat No. 110804 (.035 % C - .012% S) | 1550F/1 hr, air cooled - Tempered 950F/2 hr Tempered 975F/3 hr | 368 350 302 | 83 90 108 |
| Heat No. 131348 (.030% C - .021% S) | 1550F/1 hr, air-cooled Box annealed | 352 251 | 86 120 |
| Heat No. X65483 (.018% C - .090% S) | Box annealed | 248 | 140 |

*Increasing percentages indicate improved machinability.

Figure 3:
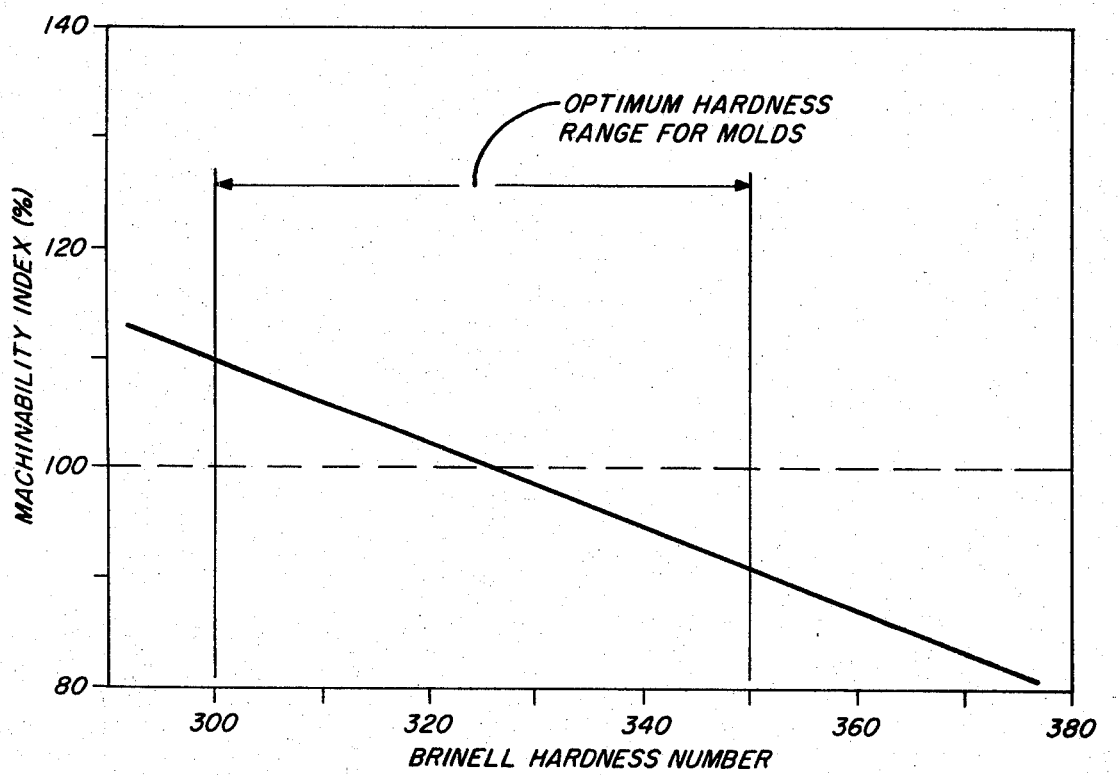
FIG. 3 is a graph showing machinability as a function of hardness for material in accordance with the invention.

The data, which are also presented schematically for Heats 110804 and 131187 in FIG. 3, show that machinability decreases significantly with increasing hardness. Moreover, the data show that to obtain machinability comparable to that of the standard P–20 steel, the hardness of steel molds made in accordance with the invention should not exceed about 350 BHN when sulfur content is below about 0.02 percent. Lowering the hardness of the subject steel molds below 300 BHN produces better machinability than exhibited by the standard P–20 material, but is not desirable because of decreased mold durability. A comparison of the machinability data for Heats 131348 and X65483 in Table III illustrates the beneficial effect on the ease of machining produced by increasing sulfur content from 0.02 to 0.09 percent.

TABLE IV

RELATIVE CORROSION RESISTANCE OF INVENTED MOLD MATERIAL (HT. 130330), AISI TYPE 410 AND TYPE 420 STAINLESS AT 328 BHN

| Material | Metallurgical Condition | Hardness (BHN) | Corrosion rate* g/sq. in./hr |
|---|---|---|---|
| Ht 130330 | Air-cooled from 1550F and stress-relieved | 328 | 0.028 |
| Type 410 | Oil-quenched from 1800F and tempered | 328 | 0.122 |
| Type 420** | Oil-quenched from 1652F and tempered | 328 | 0.16 |
| Type 420** | Oil-quenched from 1904F and tempered | 328 | 0.08 |

*Average corrosion rate after testing for 3 hours in 5% $HNO_3$ - 1% HCl.
**Data obtained from E. A. Oldfield and G. B. Graves, "Effect of Hardening and Tempering on the Corrosion Resistance of 13% - Cr Steel," Metal Treatment and Drop Forging, June 1956, pages 211 to 215.

Table IV lists the comparative corrosion resistance of the steels of this invention and the commonly used stainless injection mold steels, AISI Types 410 and 420. It is quite apparent that the martensitic stainless steel made in accordance with the invention shows the lowest weight loss in the highly corrosive solution of 5 percent nitric acid – 1 percent hydrochloric acid. The steel molds of this invention therefore provide comparable, if not better, corrosion resistance than the conventional stainless steel plastic-injection molds now commonly used.

TABLE V

SIZE CHANGE OF INVENTED MOLD MATERIAL (HT. 110804) AND AISI TYPE 420 STAINLESS DURING HARDENING

| Material | Size Change (Microinch/inch) |
|---|---|
| Ht. 110804* | −130 to +120 |
| AISI Type 420** | +500 to +2200 |

*Austenitized at 1550F/1 hr., air cooled.
**"Selection of Materials for Plastic Molds," Metals Handbook, 8th Edition, American Society for Metals, Cleveland, page 771.

In those instances where molds are rough machined from annealed steel blocks and are then heat treated and finish machined, the size changes during this heat treatment will affect the finishing costs of the die. It is shown in Table V that the linear length change of the steels in accordance with the practice of this invention after air cooling from 1,550°F is a magnitude less than that experienced by Type 420 steel during the hardening treatment. Thus with the subject stainless steel molds it may be possible, in many instances, to eliminate finish machining operations altogether.

The hardenability of a mold material is also important in those instances where molds are rough machined and then subsequently hardened and finish machined. Large molds, for example, are preferably air-hardened to reduce thermal shock and minimize distortion when they have sufficient hardenability to through-harden. Steel molds with insufficient hardenability to be air-hardened must be oil-quenched, and accordingly require that machining tolerances be greater to allow for increased distortion. Moreover, the danger of cracking during heat treatment is greater with oil-quenched steels than with those that can be air-cooled after austenitizing. Table VI shows, in this respect, that mold materials made in accordance with the invention have significantly better hardenability than AISI Type 420 stainless and P–20 low alloy steel, and hence can be through-hardened by air-cooling in much larger section sizes. Large steel molds made in accordance with the invention therefore can be produced with significantly less distortion and danger of cracking during heat treatment.

TABLE VI

RELATIVE HARDENABILITY OF INVENTED MOLD MATERIAL (HT. 110804), AND TYPE 420 STAINLESS STEEL*

| Material | Maximum Attainable Hardness | Hardness at the center of an air-cooled 25-in round* |
|---|---|---|
| Ht 110804 | 322 BHN | 322 BHN |
| Type 420** | 600 BHN | 165 BHN |
| P–20 | 484 BHN | 100 BHN |

*Hardness simulated by cooling small specimens from 1550F to room temperature at a controlled rate.
**Data for Type 420 obtained from W. Peter and W. Matz, Das Umwandlungsverhalten von Stahlen mit 12 bis 14% Cr, Archiv fuer das Eisenhuettenwessen 28, No. 12, December 1957, 815–819.

The impact resistance of a plastic injection mold steel (toughness) assumes importance when the mold construction incorporates thin ribs which in turn are subjected to impact of the pressure-injected plastic material. Table VII shows that the Charpy V-notch strength of the steel molds in accordance with the invention is unaffected by the temperature of the environment down to 0°F. Furthermore, the data show that the impact toughness of the subject steel molds is superior to that of molds conventionally produced of Type 420 stainless steel.

TABLE VII

CHARPY V-NOTCH IMPACT PROPERTIES OF INVENTED MOLD MATERIAL (HT. X65483), P–20, AND TYPE 420 STAINLESS STEEL

| Steel Grade | Hardness (BHN) | Test Temperature (°F) | Charpy V-Notch Impact Value (ft-lb) |
|---|---|---|---|
| Ht. X65483* | 300 | 0 | 33 |
|  |  | 74 | 33 |
| P–20 | 322 | 74 | 41 |
| Type 420 | 300 | 74 | 15 |

*Hardened 1400F/one half hr. Air cooled.

Because of the low carbon and nitrogen contents of the steels in accordance with the invention they show negligible linear movement after austenitizing and cooling (see Table V) and, hence, little tendency toward weld cracking. Accordingly, stainless steel molds in accordance with the invention can be welded without the necessity for pre- or post-heat treatment, a requirement with Type 420 stainless steel. This simplified welding procedure facilitates the repair or modification of plastic injection molds in operation.

We claim:

1. A method for producing stainless steel molds particularly suited for use in plastic injection molding, said method comprising producing a steel casting of the following composition comprising, in weight percent:

| Carbon | .06 max. |
| Manganese | 2 max. |
| Silicon | 1 max. |
| Nickel | 2 to 4.0 |
| Chromium | 10.0 to 14.0 |
| Molybdenum | 1.0 max. |
| Nitrogen | .05 max. |
| Sulfur | Up to 0.10 |
| Copper | 1.0 max. |
| Iron | Balance | working said casting to form a mold block, heat treating said mold block to a hardness within the range of 300 to 400 BHN, and machining said mold block to form a mold cavity therein.

2. The method of claim 1 wherein said steel casting is produced of the following composition comprising, in weight percent:

| Carbon | .03 max. |
| Manganese | .50 max. |
| Silicon | .50 max. |
| Nickel | 2.5 to 3.5 |
| Chromium | 11.0 to 13.0 |
| Molybdenum | .50 max. |
| Nitrogen | .03 max. |
| Sulfur | .03 max. |
| Copper | .50 max. |
| Iron | Balance |

3. The method of claim 1 wherein said heat treating includes heating to a temperature within the range of 1,300° to 1,600°F and air cooling.

4. The method of claim 1 wherein said heat treating includes heating to a temperature of about 1,550°F and air cooling.

5. The method of claim 1 wherein said mold block after said heat treating is stress-relief annealed.

6. The method of claim 5 wherein said mold block is stress-relief annealed at a temperature within the range of 500° to 800°F.

7. A method for producing steel molds particularly suited for use in plastic injection molding, said method comprising producing a steel casting of the following composition comprising, in weight percent:

| Carbon | .06 max. |
| Manganese | 2 max. |
| Silicon | 1 max. |
| Nickel | 2 to 4.0 |
| Chromium | 10.0 to 14.0 |
| Molybdenum | 1.0 max. |
| Nitrogen | .05 max. |
| Sulfur | Up to 0.10 |
| Copper | 1.0 max. |
| Iron | Balance | working said casting to form a mold block, heat treating said mold block at a temperature within the range of 1,300° to 1,600°F and air cooling to achieve a hardness within the range of 300 to 400 BHN and machining said mold block to form a mold cavity therein.

8. A steel mold particularly suited for use in plastic injection molding constructed from a steel comprising, in weight percent:

| | |
|---|---|
| Carbon | .06 max. |
| Manganese | 2.0 max. |
| Silicon | 1 max. |
| Nickel | 2 to 4.0 |
| Chromium | 10.0 to 14.0 |
| Molybdenum | 1.0 max. |
| Nitrogen | .05 max. |
| Sulfur | Up to 0.10 |
| Copper | 1 max. |
| Iron | Balance | said mold being heat treated to a hardness within the range of 300 to 400 BHN.

9. The mold of claim 8 constructed from a steel comprising, in weight percent:

| | |
|---|---|
| Carbon | .03 max. |
| Manganese | 0.50 max. |
| Silicon | 0.50 max. |
| Nickel | 2.50 to 3.50 |
| Chromium | 11.0 to 13.0 |
| Molybdenum | .50 max. |
| Nitrogen | .03 max. |
| Sulfur | .03 max. |
| Copper | .50 max. |
| Iron | Balance |

* * * * *